(12) United States Patent
Okubo et al.

(10) Patent No.: US 12,211,988 B2
(45) Date of Patent: Jan. 28, 2025

(54) METHOD FOR PRODUCING ELECTRODE SHEET

(71) Applicants: Prime Planet Energy & Solutions, Inc., Tokyo (JP); TOYOTA JIDOSHA KABUSHIKI KAISHA, Aichi-ken (JP)

(72) Inventors: Sokichi Okubo, Okazaki (JP); Tomoyuki Uezono, Okazaki (JP); Momoka Miyajima, Toyota (JP); Nagisa Shimasaki, Nagoya (JP); Miyuki Matsuyama, Toyota (JP)

(73) Assignees: PRIME PLANET ENERGY & SOLUTIONS, INC., Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 478 days.

(21) Appl. No.: 17/731,184

(22) Filed: Apr. 27, 2022

(65) Prior Publication Data

US 2022/0352490 A1 Nov. 3, 2022

(30) Foreign Application Priority Data

Apr. 28, 2021 (JP) .................................. 2021-076103

(51) Int. Cl.
*H01M 4/04* (2006.01)
*H01M 4/133* (2010.01)
(Continued)

(52) U.S. Cl.
CPC ......... *H01M 4/0435* (2013.01); *H01M 4/133* (2013.01); *H01M 4/1393* (2013.01); *H01M 4/623* (2013.01)

(58) Field of Classification Search
CPC .. H01M 4/0435; H01M 4/1393; H01M 4/623; H01M 4/133
See application file for complete search history.

(56) References Cited

U.S. PATENT DOCUMENTS

2005/0236732 A1* 10/2005 Brosch ................ H01M 4/0404
264/210.2
2017/0256781 A1* 9/2017 Suzuki .................. H01M 4/139
(Continued)

FOREIGN PATENT DOCUMENTS

JP       H11-3701 A       1/1999
JP     2002-324549 A     11/2002
(Continued)

*Primary Examiner* — Brittany L Raymond
(74) *Attorney, Agent, or Firm* — HAUPTMAN HAM, LLP

(57) ABSTRACT

A method for producing an electrode sheet includes roll-pressing an uncompressed electrode sheet including a current collecting foil and an uncompressed electrode layer formed thereon and made from composite particles including active material particles and binder particles, by feeding the uncompressed electrode sheet to pass through a gap between first and second rolls to compress, and heating the sheet so that the active material particles are bonded to each other and also to the current collecting foil. A first outer peripheral surface temperature of the first roll contacting the foil falls within a temperature range from a binder-resin melting start temperature +5° C. to +25° C., and a second outer peripheral surface temperature of the second roll contacting the uncompressed electrode layer is lower than the first outer peripheral surface temperature and further falls within a temperature range not exceeding the melting start temperature +5° C.

4 Claims, 6 Drawing Sheets

(51) Int. Cl.
*H01M 4/1393* (2010.01)
*H01M 4/62* (2006.01)

(56) References Cited

U.S. PATENT DOCUMENTS

2020/0168889 A1* 5/2020 Tanaka .................... B29C 43/58
2022/0190309 A1   6/2022 Uezono et al.

FOREIGN PATENT DOCUMENTS

| | | |
|---|---|---|
| JP | 2019-67572 A | 4/2019 |
| JP | 2020-68113 A | 4/2020 |
| JP | 2020-87695 A | 6/2020 |
| JP | 202293920 A | 6/2022 |

* cited by examiner

METHOD FOR PRODUCING ELECTRODE SHEET

CROSS-REFERENCE TO RELATED APPLICATIONS

This application is based upon and claims the benefit of priority to Japanese Patent Application No. 2021-076103 filed on Apr. 28, 2021, the entire contents of which are incorporated herein by reference.

BACKGROUND

Technical Field

The present disclosure relates to a method for producing an electrode sheet.

Related Art

Conventionally, there is known an electrode sheet having an electrode mixture layer on either or both surfaces of a current collecting foil. A conventional art related to a method for producing such an electrode sheet is disclosed for example in Japanese unexamined patent application publication No. 2020-068113 (JP 2020-068113A).

In the above-identified publication, active material powder and binder powder are first mixed without a solvent to prepare mixed powder formed from composite particles with a plurality of binder particles bonded to the surface of each active material particle. This mixed powder is then attracted by electrostatic force to deposit on the surface of a current collecting foil, forming an electrode layer that is uncompressed. Thus, an uncompressed electrode sheet including the uncompressed electrode layer is produced. Subsequently, in a roll-pressing step, the uncompressed electrode sheet is passed (roll-pressed) through a pair of hot rolls, i.e., a first roll and a second roll, which are opposed and rotated in opposite directions. In this process, the electrode layer and the current collecting foil are compressed while the binder resin contained in the electrode layer is softened or melted, thereby producing an electrode sheet in which the electrode layer, which contains the active material particles and the binder resin, is bonded to the surface of the current collecting foil.

SUMMARY

Technical Problems

In some cases, however, a part of the electrode layer may be peeled off from the current collecting foil, causing the binder resin and the active material particles to adhere to the roll surface, or a peeled part of the electrode layer may lift up from the current collecting foil, even though does not adhere to the roll surface. The present disclosure has been made to address the above problems and has a purpose to provide a method for producing an improved electrode sheet.

Means of Solving the Problems (1) To achieve the above-mentioned purpose, one aspect of the present disclosure provides a method for producing an electrode sheet that includes a current collecting foil having a first surface and a second surface, which is opposite the first surface, and an electrode layer on the second surface, the method comprising: roll-pressing an uncompressed electrode sheet, the uncompressed electrode sheet including: the current collecting foil, and an uncompressed electrode layer formed on the second surface of the current collecting foil and made from deposited composite particles including active material particles and a plurality of binder particles bonded to each of the active material particles, the binder particles being made of binder resin and each having a smaller diameter than each of the active material particles, the uncompressed electrode sheet having a sheet temperature that is a room temperature, by feeding the uncompressed electrode sheet to pass through a roll gap between a first roll having a first outer peripheral surface which is brought in contact with the first surface of the current collecting foil and a second roll having a second outer peripheral surface which is brought in contact with an outer surface of the uncompressed electrode layer to compress the uncompressed electrode sheet in a thickness direction, and heating the uncompressed electrode sheet in the roll gap so that the active material particles are bonded to each other through the binder resin and the active material particles are bonded to the second surface of the current collecting foil through the binder resin, wherein the roll-pressing is performed under conditions that: the first outer peripheral surface of the first roll has a first outer peripheral surface temperature set to fall within a temperature range from a melting start temperature of the binder resin +5° C. to the melting start temperature +25° C., expressed as $Ti+5°\ C. \le TR1 \le Ti+25°\ C.$, and the second outer peripheral surface of the second roll has a second outer peripheral surface temperature set to be lower than the first outer peripheral surface temperature and fall within a temperature range equal to or less than the melting start temperature of the binder resin +5° C., expressed as $TR2<TR1$, and $TR2 \le Ti+5°\ C.$, wherein Ti is the melting start temperature, TR1 is the first outer peripheral surface temperature, and TR2 is the second outer peripheral surface temperature.

Focusing attention on the temperature characteristics of loss tangent (tan δ) obtained by dynamic viscoelasticity measurement, particularly on the temperature characteristics of the temperature range of the melting point (Tm) or less of the binder resin, the binder resin described above has such characteristics that the loss tangent (tan δ) increases slowly in a linear fashion as the temperature rises, and changes to sharply increase in a linear fashion with increasing of the temperature as the temperature approaches the melting point (Tm). This temperature at which the loss tangent (tan δ) starts to sharply increase is referred to as a melting start temperature (Ti) of the binder resin.

Specifically, for the binder resin, the relationship between temperature and dynamic viscoelasticity is measured over the temperature range from the temperature at which the binder resin is in a rubber state above the glass transition temperature to the temperature at which the binder resin melts above the melting point (Tm), e.g., the temperature range from the melting point −50° C. (Tm−50° C.) to the melting point+20° C. (Tm+20° C.), to obtain the temperature characteristics of the loss modulus (G"), the storage modulus (G'), and the loss tangent (tan δ (=G"/G')) representing the ratio therebetween. Then, in the temperature range closer to the melting point (Tm) than the glass transition temperature, the loss modulus (G") and the storage modulus (G') of the binder resin both gradually decrease as the temperature rises. However, as the temperature further approaches the melting point (Tm), the loss modulus (G") and the storage modulus (G') decrease sharply with increasing temperature. However, once the temperature reaches the melting point (Tm) and the binder resin comes into a melted state, the loss modulus (G") and the storage modulus (G') no longer decrease sharply, and turn to slow decreasing with increasing temperature. Since the loss modulus (G") and the storage modulus (G') change as above, the loss tangent (tan δ (=G"/G')) of the binder resin, which is the ratio therebetween, gradually and generally increases in a linear fashion as the temperature rises in the temperature region closer to the melting point (Tm) than the glass transition temperature. The loss modulus (G") and the storage modulus (G') both decrease as the temperature rises, which is presumably because, as the temperature is higher, the rate of loss of vibration energy applied in softening the binder resin is larger. As the temperature further approaches the melting point (Tm), the loss tangent (tan δ) increases rapidly (in the form of a ramp function) in a certain region as the temperature rises. This is assumably because as part of the binder resin starts to melt, the loss modulus (G") and the storage modulus (G') decrease sharply, but the percentage of decrease in the storage modulus (G') is large, and the loss tangent (tan S), or the loss, increases significantly as the temperature rises. However, when the temperature reaches the melting point (Tm) and the binder resin becomes melted, the loss tangent (tan δ) turns around and settles down to a high, but generally constant value. The temperature at which the binder resin starts to melt and the loss tangent (tan S) starts to increase rapidly with increasing temperature is referred to as the melting start temperature (Ti).

The resins that can take on the temperature characteristics of the loss tangent (tan δ) described above are crystalline resins having a glass transition temperature and a melting point, and may include, for example, fluorinated resins, such as PVDF (polyvinylidene chloride) and PTFE (polytetrafluoroethylene), PE (polyethylene), PP (polypropylene), PA (polyamide). POM (polyacetal, polyoxymethylene), PET (polyethylene terephthalate), PBT (polybutylene terephthalate), PPS (polyphenylene sulfide), and PEEK (polyether ether ketone).

In the above-mentioned producing method, the roll-pressing is performed by setting the first outer peripheral surface temperature (TR1) of the first outer peripheral surface of the first roll, which is brought into contact with the first surface of the current collecting foil, to a temperature equal to or higher than the binder-resin melting start temperature (Ti)+5° C., expressed as Ti+5° C.≤TR1. Therefore, the temperature (TC) of the current collecting foil, which comes into contact with the first outer peripheral surface of the first roll, also roughly becomes equal to or higher than the binder-resin melting start temperature (Ti)+5° C., expressed as Ti+5° C.≤TC≈TR1. Therefore, in the uncompressed electrode layer, the binder particles of the composite particles existing near the second surface of the current collecting foil can be melted, and the active material particles can be surely bonded to the second surface of the current collecting foil through the melted binder resin.

In addition, since the first outer peripheral surface temperature (TR1) of the first roll is set to be equal to or lower than the melting start temperature (Ti)+25° C., expressed as TR1≤Ti+25° C., the temperature (TC) of the current collecting foil contacting the first outer peripheral surface of the first roll also becomes nearly equal to or lower than the binder-resin melting start temperature (Ti)+25° C., expressed as TC≈TR1≤Ti+25° C. Therefore, in the uncompressed electrode layer, even when the binder particles of the composite particles located near the second surface of the current collecting foil are melted, the viscosity of the binder resin of the melted binder particles does not so decrease as to excessively lower the adhesive force. The binder resin and the active material particles once adhered to the second surface of the current collecting foil, i.e., the electrode layer under compression, is prevented from peeling off from the second surface of the current collecting foil and further adhering to the second outer peripheral surface of the second roll.

In the above-described producing method, furthermore, the roll-pressing is performed by setting the second outer peripheral surface temperature (TR2) of the second outer peripheral surface of the second roll, which is brought into contact with the outer surface of the uncompressed electrode layer, to a temperature lower than the first outer peripheral surface temperature (TR1) of the first outer peripheral surface of the first roll, which is brought into contact with the first surface of the current collecting foil. Therefore, in the uncompressed electrode layer, a part located on the side close to the outer surface is lower in temperature than a part located on the side close to the current collecting foil and thus the binder resin in that former part is hard to melt, so that the uncompressed electrode layer is less likely to adhere to the second roll and peel off from the current collecting foil.

The roll-pressing is performed with the second outer peripheral surface temperature TR2 set within the temperature range not exceeding the binder-resin melting start temperature (Ti)+5° C., expressed as TR2<TR1, and TR2≤Ti+5° C.

Thus, the temperature (TE) of the outer surface of the uncompressed electrode layer, which is brought into contact with the second outer peripheral surface of the second roll, also becomes equal to or lower than the binder-resin melting start temperature (Ti)+5° C., expressed as TE≈TR2≤Ti+5° C. Moreover, the uncompressed electrode sheet, which has not been preheated and whose sheet temperature is a room temperature, is passed through the roll gap and compressed in the thickness direction while the uncompressed electrode sheet is heated in the roll gap. Thus, the uncompressed electrode layer is heated only for a short period. Accordingly, the temperature (TE) of the outer surface of the uncompressed electrode layer which contacts with the second outer peripheral surface of the second roll does not reach the binder-resin melting start temperature (Ti) (TE<Ti), or even if it does, the period is very short, and at most TE≤Ti+5° C., so that the binder resin does not melt sufficiently in the outer surface of the electrode layer. This configuration prevents the binder particles of the composite particles located near the outer surface of the uncompressed electrode layer from melting to suppress the melted binder resin and the active material particles through the binder resin from adhering to the second outer surface of the second roll.

The room temperature represents a temperature within the range of +5° C. to +35° C.

(2) In the electrode sheet described in (1), the roll-pressing is performed under conditions that; the second outer peripheral surface temperature is lower by 10° C. or more than the first outer peripheral surface temperature and falls within a temperature range equal to or less than the melting start temperature of the binder resin +5° C., expressed as TR2≤TR1−10° C., and TR2≤Ti+5° C.

In the foregoing producing method, the roll-pressing is performed with the second outer peripheral surface temperature (TR2) set to be lower by 10° C. or more than the first outer peripheral surface temperature (TR1) and fall within the temperature range not exceeding the binder-resin melting start temperature (Ti)+5° C. In this way, since the second outer peripheral surface temperature (TR2) is set sufficiently lower than the first outer peripheral surface temperature (TR1), so that the binder resin and the active material particles, which constitute the electrode layer, can be surely bonded to the current collecting foil, while they are reliably prevented from adhering to the second outer peripheral surface of the second roll.

(3) In the method for producing the electrode sheet described in (1) or (2), the active material particles are graphite particles, and the binder resin is polyvinylidene chloride (PVDF).

In the above-described producing method, the active material particles used for the electrode layer are graphite particles, and the binder resin is PVDF. Thus, the electrode sheet can be manufactured appropriately.

DETAILED DESCRIPTION OF THE EXEMPLARY EMBODIMENTS

Figure 1:
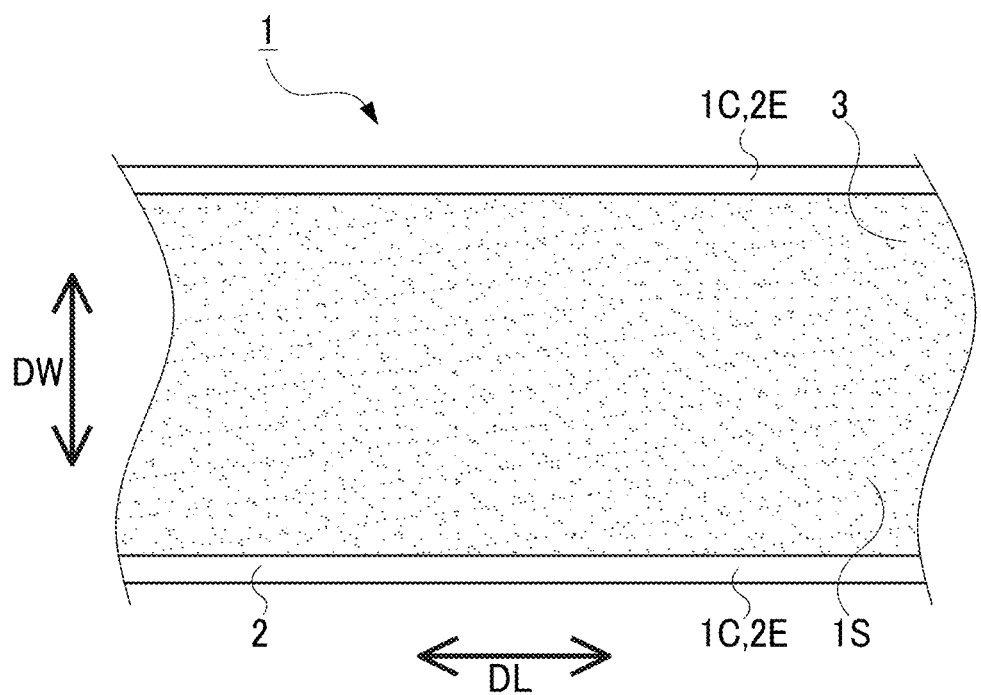
FIG. 1 is a plan view of a negative electrode sheet in an embodiment.
Figure 2:
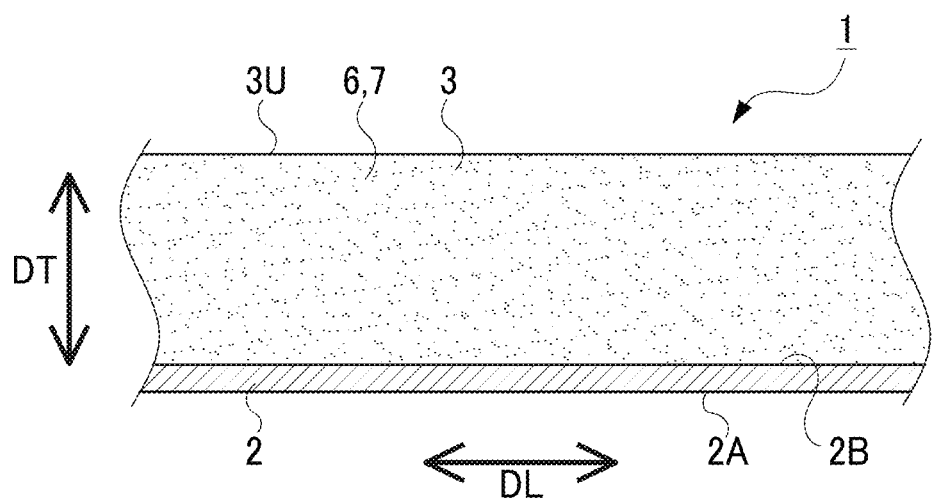
FIG. 2 is a cross-sectional view of the negative electrode sheet in the embodiment.

A detailed description of typical embodiments of this disclosure will now be given referring to FIGS. 1 to 6. In the present embodiment, the present disclosure is applied to production of a negative electrode sheet of a lithium ion secondary battery. In the present embodiment, specifically, the method for producing an electrode sheet is exemplified by a production method for a negative electrode sheet 1. In the present embodiment, a strip-shaped negative electrode sheet 1 (one example of an electrode sheet of the present disclosure) is produced, including a strip-shaped current collecting foil 2, a strip-shaped negative electrode layer 3 (one example of an electrode layer of the present disclosure) formed on the second surface 2B, which is one of the surfaces of the current collecting foil 2 (see FIGS. 1 and 2).

The negative electrode sheet 1 in the present embodiment will be first described below. The negative electrode sheet 1 having a long strip shape extending in a longitudinal direction DL is provided, as mentioned above, with the current collecting foil 2 having a long strip shape extending in the longitudinal direction DL, and the negative electrode layer 3 having a long strip shape in the longitudinal direction DL. The current collecting foil 2 has a pair of surfaces; a first surface 2A and a second surface 2B. The negative electrode layer 3 is formed on the second surface 2B of the current collecting foil 2 at the center thereof in a width direction DW. Accordingly, this negative electrode sheet 1 includes an overlapped part 1S located at the center in the width direction DW, in which the current collecting foil 2 and the negative electrode layer 3 overlap one on the other, and further current collecting parts 1C located on both sides of the negative electrode layer 3 in the width direction DW, that is, on an upper side and a lower side in FIG. 1, which correspond to foil exposed portions 2E in which the current collecting foil 2 are exposed, or uncoated.

In the negative electrode sheet 1, the current collecting foil 2 is made of a copper foil having a thickness of 8 μm. The negative electrode layer 3 consists of active material particles 6 which are graphite particles, and binder resin 7 which binds the active material particles 6 to each other and bonds the active material particles 6 to the current collecting foil 2. The graphite particles for the active material particles 6 may include for example spherical graphite and flake graphite, and the spherical graphite is used in this embodiment. The binder resin 7 may include fluorinated resins, such as PTFE and PVDF, and PVDF is used for the binder resin 7 in the present embodiment. The binder resin 7 (PVDF) in the present embodiment has a melting start temperature Ti of 155° C. (Ti=155° C.) (see FIG. 3).

The above value of the melting start temperature Ti of the binder resin 7 (PVDF) is obtained as follows. Specifically, the dynamic viscoelasticity (storage modulus G' and loss modulus G") and the loss tangent tan δ(=G"/G') are measured by means of Dynamic viscoelastic analyzer DVA-220 manufactured by IT Measurement Control Co. Ltd. under the condition that 0.05 g of the binder resin 7 is applied with strain at 10 Hz. Further, when the binder resin starts to melt as the temperature T rises, the temperature T at which the storage modulus G' and the loss modulus G" start to rapidly decrease and conversely the loss tangent tan δ starts to rapidly increase is referred to as a melting start temperature Ti. Specifically, of the temperature characteristics of the loss tangent tan δ of the binder resin 7 shown in FIG. 3, the loss tangent tan δ increases slowly in a linear fashion as the temperature T rises in the temperature range (e.g., 100° C. to 164° C.) including the melting point Tm of the binder resin 7 (164° C.), and changes to sharply increase in a linear fashion with increasing of the temperature T as the temperature T approaches the melting point Tm. This temperature T at which the loss tangent tan δ starts to change to sharp increase is referred to as a melting start temperature Ti.

Figure 3:
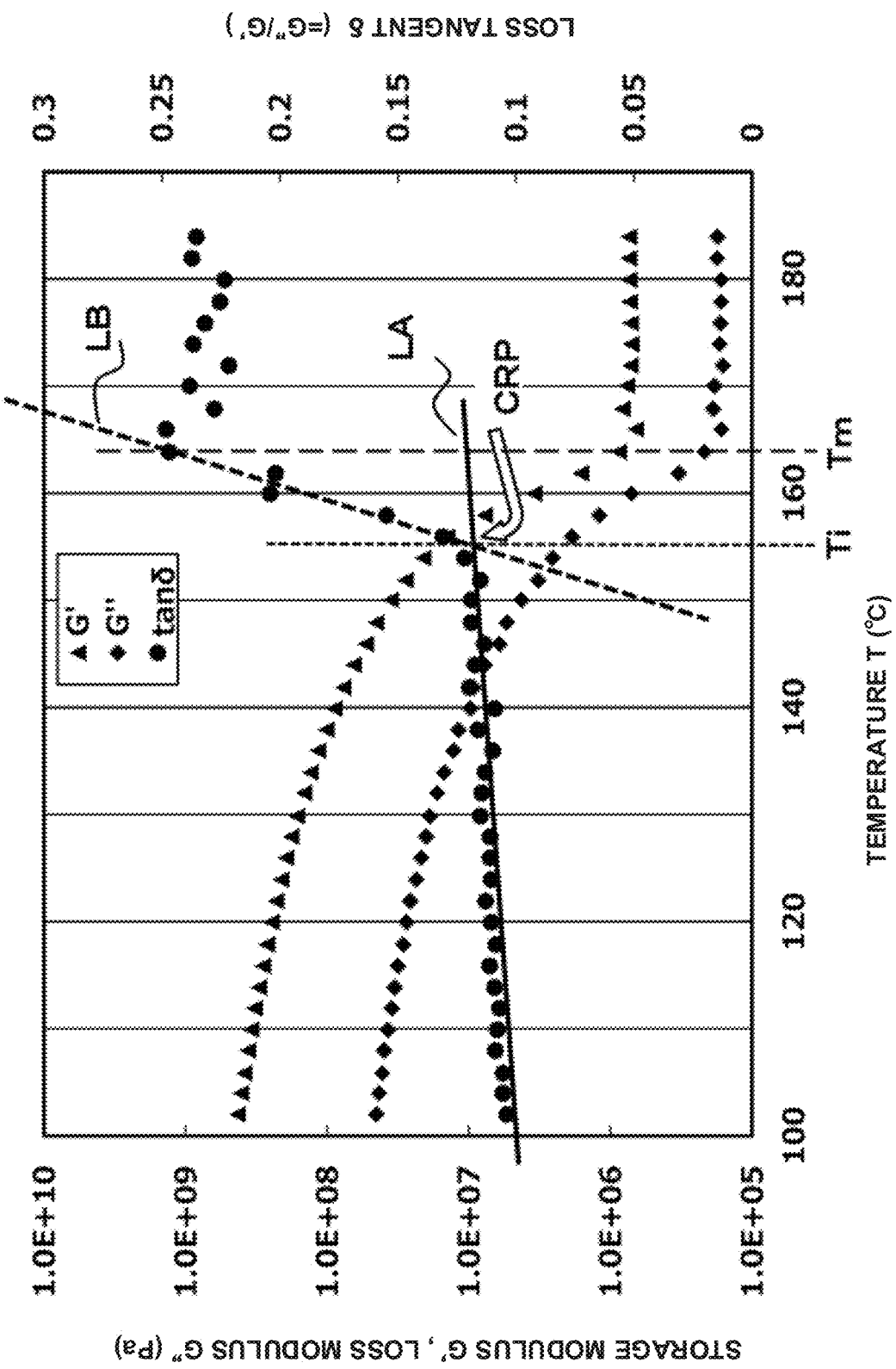
FIG. 3 is a graph showing temperature characteristics of dynamic viscoelasticity (storage modulus and loss tangent) of binder resin, and melting start temperature and melting point.

More specifically, among the measurement points of the loss tangent tan δ indicated by a black circle ● in FIG. 3, a regression line LA is obtained from the measurement points in the temperature range of 100 to 150° C., indicating that tan δ increases linearly and slightly with increasing of the temperature T. Further, a regression line LB is obtained from the measurement points in the temperature range of 156 to 164° C., indicating that tan δ increases linearly and sharply with increasing of the temperature T. The temperature T corresponding to an intersection point CRP at which the regression lines LA and LB intersect is referred to as the melting start temperature Ti. For the binder resin 7 in the present embodiment, the melting start temperature Ti is 155° C. (Ti=155° C.) as seen in FIG. 3.

The melting point Tm is the temperature at which the storage modulus G' and the loss modulus G" stop decreasing rapidly with increasing of the temperature T and turn to a transition that decreases slowly as the temperature T rises. The melting point Tm is 164° C.

Figure 4:
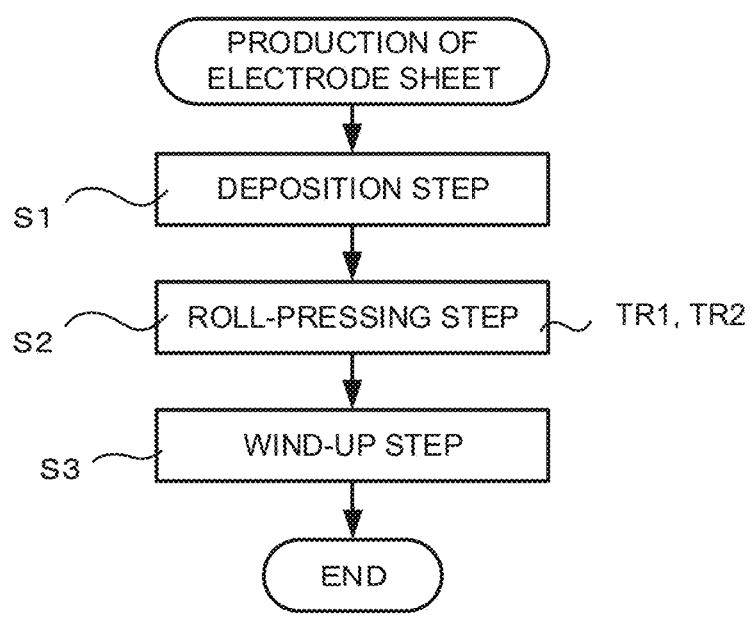
FIG. 4 is a flowchart showing a process of producing a negative electrode sheet in the embodiment.

Next, a method for producing the negative electrode sheet 1 in the present embodiment will be described below, referring to FIGS. 4 and 6. In a deposition step S1, an uncompressed negative electrode sheet 11 is formed first to include an uncompressed negative electrode layer 13 made from composite particles 15 deposited to be 55 mm in width×180 μm in thickness on the second surface 2B of a strip-shaped current collecting foil 2 having dimensions of 200 m in length×100 mm in width×8 μm in thickness. The uncompressed negative electrode sheet 11 is a to-be-compressed negative electrode sheet which will become the negative electrode sheet 1 after compression.

The composite particles 15 used in the deposition step S1 are prepared by mixing the powder of active material particles 6 and the powder of binder particles 17 with a ratio of 97.5:2.5 by weight. To be more specific, the active material particles 6 and the binder particles 17 are mixed with the above-described ratio using a high-speed mixer (manufactured by EARTHTECHNICA CO., LTD.) to produce composite particles 15 in which the active material particles 6 are each attached with a plurality of binder particles 17 each having a smaller diameter than each active material particle 6.

Figure 5:
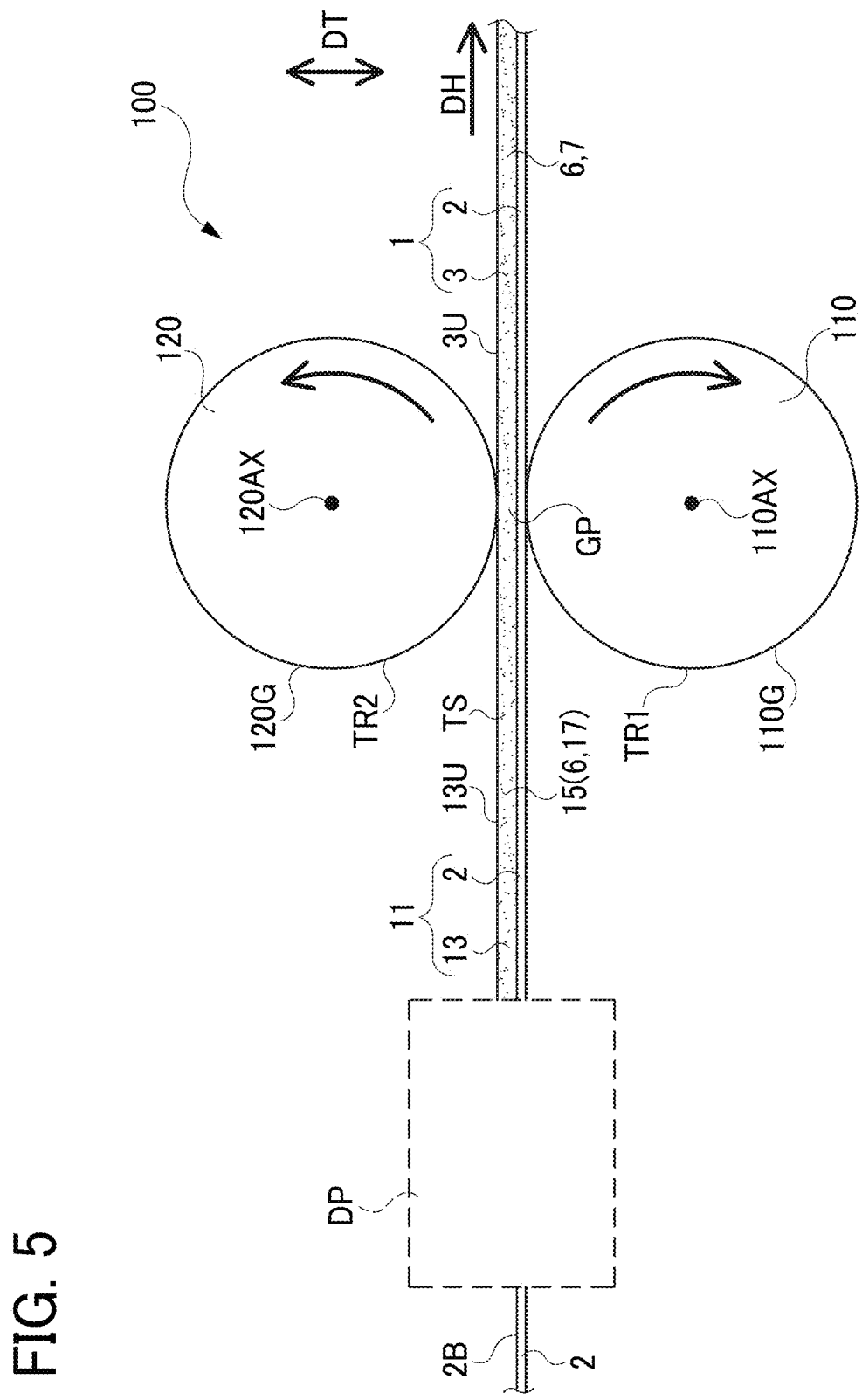
FIG. 5 is an explanatory view showing production of the negative electrode sheet in the embodiment.

In the deposition step S1, the uncompressed negative electrode layer 13 with the composite particles 15 deposited on the second surface 2B of the current collecting foil 2 is formed by a deposition device DP indicated by a dashed line in FIG. 5. The deposition method to be implemented using this deposition device DP may include, for example, a method of forming the uncompressed negative electrode layer 13 by attracting and depositing the composite particles 15 by electrostatic force onto the current collecting foil 2.

As a concrete example of the deposition method, the foregoing composite particles 15 are mixed with magnetic carrier particles (not shown) to prepare composite carrier particles (not shown) in which the composite particles 15 are electrostatically adsorbed onto the magnetic carrier particles. Then, the prepared composite carrier particles are adsorbed magnetically onto the roll surface of a magnet roll (not shown) and moved to a film deposition region (not shown), and further the composite particles 15 adsorbed on the magnetic carrier particles are subjected to an electrostatic force Fs caused by a DC voltage applied between a backup roll (not shown) around which the current collecting foil 2 is wound and the magnet roll, which causes the composite particles 15 to fly from the magnet roll to the current collecting foil 2, thereby depositing the composite particles 15 on the current collecting foil 2.

In a roll-pressing step S2, subsequently, the uncompressed negative electrode sheet 11 is compressed in the thickness direction DT using a sheet compression device 100 to produce the negative electrode sheet 1 (see FIGS. 5 and 6). This sheet compression device 100 will be described below. The sheet compression device 100 includes a first roll 110 and a second roll 120. The second roll 120 is placed with its axis 120AX arranged in parallel to the axis 110AX of the first roll 110, and the first roll 110 and the second roll 120 face each other with a roll gap GP therebetween. The first and second rolls 110 and 120 are rotated in a forward direction (the first roll 110 rotates clockwise and the second droll 120 rotates counterclockwise) as indicated with arrows in FIG. 5. The uncompressed negative electrode sheet 11 pinched in the roll gap GP is compressed in the thickness direction DT and fed forward in a feeding direction DH.

In the present embodiment, the SA-602 Tabletop roll press manufactured by Tester Sangyo Co., Ltd. is used, in which the first roll 110 and the second roll 120 are both 100 mm in diameter and 165 mm in length.

Figure 6:
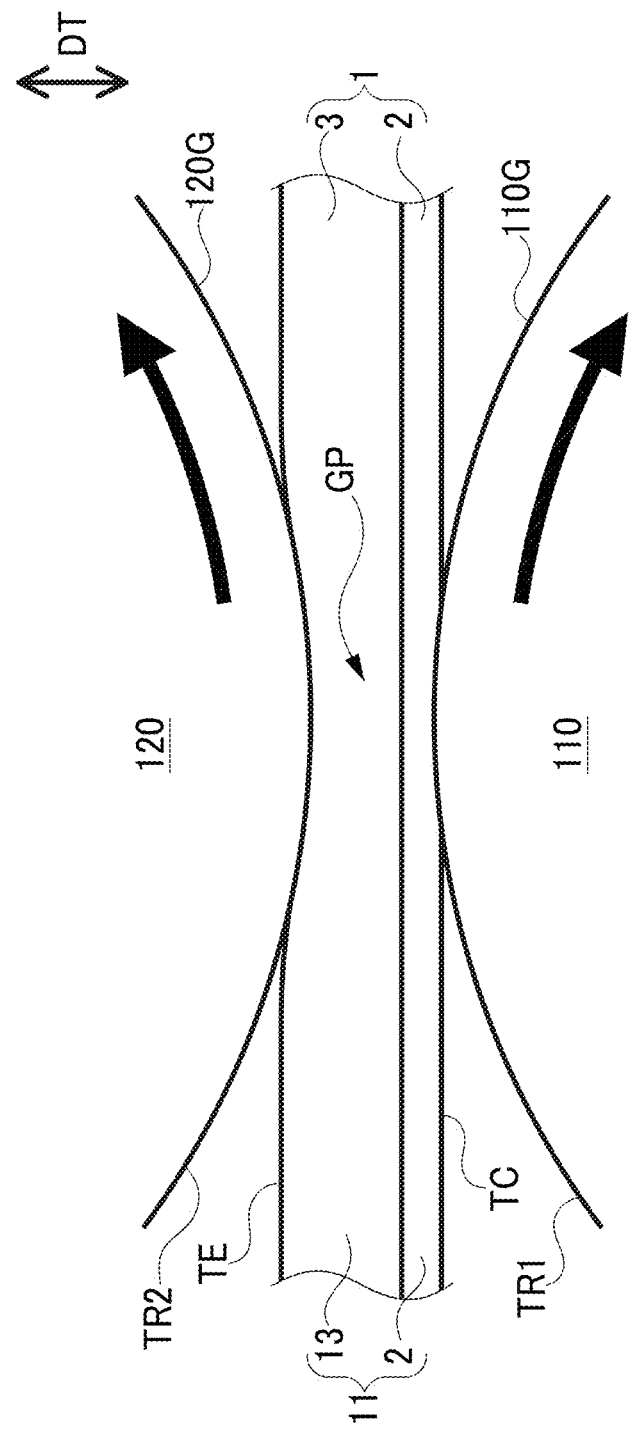
FIG. 6 is an explanatory view showing the negative electrode sheet under compression in a roll-pressing step in the embodiment.

The first roll 110 located on a lower side in FIGS. 5 and 6 has a first outer peripheral surface 110G having a first outer peripheral surface temperature TR1 which is set to 170° C. (TR1=170° C.) in the present embodiment. On the other hand, the second roll 120 located on an upper side in FIGS. 5 and 6 has a second outer peripheral surface 120G having a second outer peripheral surface temperature TR2 which is set to 140° C. (TR2=140° C.) in the present embodiment. The first outer peripheral surface temperature TR1 and the second outer peripheral surface temperature TR2 are measured by bringing the tip of a sensor probe for surface temperature measurement (Sensor probe IK-500 manufactured by CUSTOM Corporation) attached to a digital thermometer (Digital thermometer CT-1310 manufactured by CUSTOM Corporation) into contact with the outer peripheral surfaces 110G and 120G of each roll.

In the present embodiment, prior to the roll-pressing in the roll gap GP, the uncompressed negative electrode sheet 11 is not subjected to preliminary heating before pressing by contacting with one of rolls at a large wrap angle exceeding 30° as described in for example JP 2020-068113A. Specifically, the uncompressed negative electrode sheet 11 before passing through the roll gap GP has a sheet temperature TS which is a room temperature, i.e., within the range of 5 to 35° C. The uncompressed negative electrode sheet 11 whose sheet temperature TS is a room temperature is passed through the roll gap GP between the first roll 110 and the second roll 120. However, in roll-pressing, the uncompressed negative electrode sheet 11 may be passed through the roll gap GP at a wrap angle equal to or lower than 100 with respect to the first roll 110 or the second roll 120.

More specifically, as shown in FIGS. 5 and 6, the uncompressed negative electrode sheet 11 is fed toward the roll gap GP with the current collecting foil 2 being on the lower side in the figures and the uncompressed negative electrode layer 13 being on the upper side, and the first outer peripheral surface 110G of the first roll 110 is brought in contact with the first surface 2A of the current collecting foil 2, and the second outer peripheral surface 120G of the second roll 120 is brought in contact with a negative-electrode-layer outer surface 13U of the uncompressed negative electrode layer 13.

Then, roll-pressing is performed with the roll gap GP provided to apply a linear pressure of 600 kN/m and by rotating the first roll 110 and the second roll 120 at a peripheral speed of 1 m/min, thereby feeding the uncompressed negative electrode sheet 11 at 1 m/min. Thus, in the roll gap GP, the uncompressed negative electrode sheet 11 is compressed in the thickness direction DT, and the uncompressed negative electrode sheet 11 is heated by the first roll 110 and the second roll 120 so that the active material particles 6 are bonded to each other through the binder resin 7 and the active material particles 6 are bonded to to the second surface 2B of the current collecting foil 2 through the binder resin 7. That is, the negative electrode layer 3 is bonded to the second surface 2B of the current collecting foil 2. Consequently, a strip-shaped negative electrode sheet 1 having been heated and compressed in the thickness direction DT is continuously produced.

In a wind-up step S3, thereafter, the strip-shaped negative electrode sheet 1 is wound up onto a reel not shown.

In the present embodiment, the production method described as above can produce a good strip-shaped negative electrode sheet 1 without causing any defects that a part of the negative electrode layer 3 peels off and the binder resin 7 and the active material particles 6 adhere to the second outer peripheral surface 120G of the second roll 120 or a peeled part of the negative electrode layer 3 lifts up from the current collecting foil 2, even though does not adhere to the second outer peripheral surface 120G.

In the roll-pressing step S2 in the present embodiment, as described above, the first outer peripheral surface temperature TR1 of the first roll 110 is set to 170° C. (TR1=170° C.). That is, the first outer peripheral surface temperature TR1 is set to be higher by 15° C. than the melting start temperature Ti (=155° C.) of the binder resin 7 (PVDF), expressed as TR1=Ti+15° C. On the other hand, the second outer peripheral surface temperature TR2 of the second roll 120 is set to 140° C. (TR2=140° C.). That is, the second outer peripheral surface temperature TR2 is set to be lower than the first outer peripheral surface temperature TR1 (TR2<TR1) and further to be lower by 15° C. than the melting start temperature (Ti) (=155° C.) of the binder resin 7, expressed as TR2=Ti−15° C.

In the present embodiment, as described above, the second outer peripheral surface temperature TR2 of the second outer peripheral surface 120G is set to be lower by 15° C. than the melting start temperature Ti of the binder resin 7, i.e., set to a temperature at which the binder particles 17 (the binder resin 7) do not melt. Then, in the roll gap GP, the temperature TE of the negative-electrode-layer outer surface 13U of the uncompressed negative electrode layer 13 (a negative-electrode-layer outer surface 3U of the negative electrode layer 3) in contact with the second outer surface 120G of the second roll 120 also becomes a temperature equal or nearly equal to the second outer peripheral surface temperature TR2, i.e., becomes a temperature lower than the melting start temperature Ti of the binder resin 7 (TE≈TR2<Ti).

Accordingly, under the pressure by roll-pressing, the active material particles 6 can be bonded to each other through the binder particles 17 (the binder resin 7), so that the negative electrode layer 3 can be formed. However, since the adhesive force of the binder particles 17 is relatively weak, it is possible to prevent the binder particles 17 (the binder resin 7) themselves and the active material particles 6 through the binder particles 17 (the binder resin 7) from adhering to the second outer peripheral surface 120G of the second roll 120.

On the other hand, the roll-pressing is performed under the conditions, the first outer peripheral surface temperature TR1 of the first outer peripheral surface 110G of the first roll 110, which is brought into contact with the first surface 2A of the current collecting foil 2, is set to a temperature higher by 15° C. than the melting start temperature Ti of the binder resin, i.e., a temperature at which the binder particles 17 (the binder resin 7) properly melt. Accordingly, the temperature TC of the current collecting foil 2 in contact with the first outer peripheral surface 110G of the first roll 110 also becomes equal or nearly equal to the first outer peripheral surface temperature TR1, i.e., higher than the melting start temperature Ti of the binder resin 7 (TC≈TR1>Ti). Thus, in the uncompressed negative electrode layer 13, the binder particles 17 of the composite particles 15 existing near the second surface 2B of the current collecting foil 2 can be melted, thereby reliably bonding the active material particles 6 to the second surface 2B of the current collecting foil 2 through the melted binder resin 7.

Therefore, the binder particles 17 do not melt because the second outer peripheral surface temperature TR2 is too low, but the active material particles 6 can be bonded to each other through the binder particles 17 (the binder resin 7) under pressure, forming the negative electrode layer 3 in a layer (film-like) shape. On the other hand, since the first outer peripheral surface temperature TR1 is not too high, it is also conceivably possible to prevent a problem in which the viscosity of the melted binder resin 7 is reduced excessively, decreasing the adhesive strength, thereby causing a part of the negative electrode layer 3 to peel off from the current collecting foil 2 and adhere to the second outer peripheral surface 120G of the second roll 120.

Investigation Example

Figure 7:
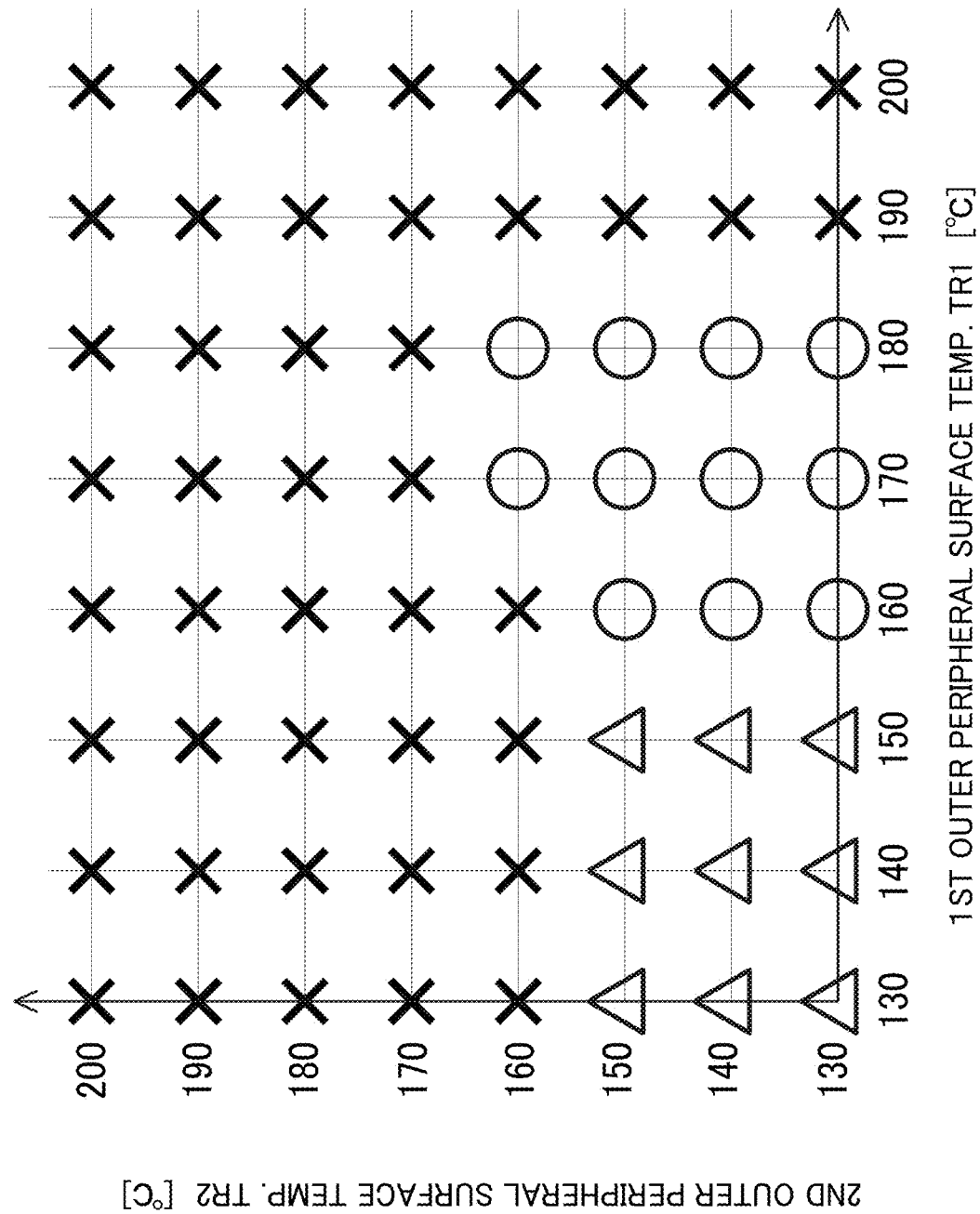
FIG. 7 is a graph showing a relationship between a first outer peripheral surface temperature and a second outer peripheral surface temperature in the roll-pressing step and the quality of a negative electrode sheet in each investigation example.

In addition, the results of investigation examples are shown in FIG. 7, investigating the quality of negative electrode sheets 1 produced in the same manner as in the present embodiment, but with the first outer peripheral surface temperature TR1 and the second outer peripheral surface temperature TR2 in the roll-pressing step S2 set different between the investigation examples. In FIG. 7, the aforementioned embodiment corresponds to an investigation example with TR1=170° C. and TR2=140° C.

In FIG. 7, the examples indicated with a circle mark ○ show that the negative electrode layer 3 did not peel off from the current collecting foil 2 and the active material particles 6 and others did not adhere to the second outer peripheral surface 120G of the second roll 120, and the negative electrode layer 3 did not lift up due to peeling off from the current collecting foil 2. These ○-marked examples are considered to occur when the formed negative electrode layer 3 is bonded properly to the current collecting foil 2, while it is less likely to adhere to the second roll 120.

In contrast, the examples indicated with a triangle mark Δ show that the negative electrode layer 3 peeled off from the current collecting foil 2 and lifted up. In these Δ-marked examples, the binder particles 17 did not melt because the first outer peripheral surface temperature TR1 was too low. Further, the active material particles 6 could be bonded to each other through the binder particles 17 (the binder resin 7) by roll-pressing, and the negative electrode layer 3 could be formed, but the adhesive strength of the negative electrode layer 3 with respect to the current collecting foil 2 is not so high. In contrast, the second outer peripheral surface temperature TR2 is also below the melting start temperature Ti, so that the binder particles 17 did not melt even on the side close to the second roll 120, and the adhesive strength of the negative electrode layer 3 with respect to the second roll 120 is low. It is therefore conceived that a part of the negative electrode layer 3 peeled off did not adhere to the second roll 120, but did lift up from the current collecting foil 2.

On the other hand, the examples indicated with a cross mark x show that a part of the negative electrode layer 3 peeled off from the current collecting foil 2 and was missing, while the active material particles 6 and others adhered to the second outer peripheral surface 120G of the second roll 120. These x-marked examples are considered to occur when the formed negative electrode layer 3 is more likely to adhere to the second roll 120 than to the current collecting foil 2.

In terms of the second outer peripheral surface temperature TR2, the results in FIG. 7 reveal that it is better to perform roll-pressing with the temperature TR2 set to be lower than the first outer peripheral surface temperature TR1 and further fall within a temperature range equal to or less than the melting start temperature Ti+5° C., expressed as TR2<TR1, and TR2≤Ti+5° C.; for example, in the present embodiment, TR2<TR1, and TR2≤160° C.

In the above way, the temperature TE of the negative-electrode-layer outer surface 13U of the uncompressed negative electrode layer 13 (the negative-electrode-layer outer surface 3U of the negative electrode layer 3), which contacts the second outer peripheral surface 120G of the second droll 120 in the roll gap GP, also becomes equal to or less than the melting start temperature Ti of the binder resin 7+5° C., expressed as TE≈TR2≤Ti+5° C. Moreover, the uncompressed negative electrode sheet 11, which is not preheated and has a sheet temperature TS that is a room temperature, is heated in the roll gap GP while it is compressed in the thickness direction DT by passing through the roll gap GP. Thus, this uncompressed negative electrode sheet 11 is heated only for a short period. Accordingly, the temperature TE of the negative-electrode-layer outer surface 13U of the uncompressed negative electrode layer 13, which contacts the second outer peripheral surface 120G of the second roll 120, does not reach the melting start temperature Ti of the binder resin 7 (TE<Ti), or even if it does, the period in which the temperature TE has reached the melting start temperature Ti is very short, and at most TE≤Ti+5° C., at which the binder resin 7 does not melt sufficiently. This prevents melting of the binder particles 17 of the composite particles 15 existing near the negative-electrode-layer outer surface 13U of the uncompressed negative electrode layer 13 to suppress the melted binder resin 7 and the active material particles 6 through the binder resin 7 from adhering to the second outer surface 120G of the second roll 120.

In addition, in terms of the first outer peripheral surface temperature TR1, the results in FIG. 7 also reveal that it is better to perform roll-pressing with the temperature TR1 set to fall within a temperature range from the melting start temperature Ti of the binder resin 7+5° C. to the melting start temperature Ti+25° C., expressed as Ti+5° C.≤TR1≤Ti+25° C.; for example, in the present embodiment and others, 160° C.≤TR1≤180° C.

In the roll-pressing step, when the roll-pressing is performed with the first outer peripheral surface temperature TR1 set to be equal to or higher than the melting start temperature Ti of the binder resin 7+5° C., expressed as Ti+5° C.≤TR1; for example, in the present embodiment and others, 160° C.≤TR1, the temperature TC of the current collecting foil 2, which contacts the first outer peripheral surface 110G of the first roll 110, also becomes equal to or higher than the melting start temperature Ti of the binder resin 7+5° C., expressed as Ti+5° C.≤TC≈TR1; for example, in the present embodiment and others, 160° C. or higher. Accordingly, in the uncompressed negative electrode layer 13, the binder particles 17 of the composite particles 15 existing near the second surface 2B of the current collecting foil 2 is melted, making sure that the active material particles 6 are bonded to the second surface 2B of the current collecting foil 2 through the melted binder resin 7.

Furthermore, the first outer peripheral surface temperature TR1 is set to be equal to or lower than the melting start temperature Ti+25° C., expressed as TR1≤Ti+25° C.; for example, in the present embodiment and others, TR1≤180° C. The temperature TC of the current collecting foil 2, which contacts the first outer peripheral surface 110G of the first roll 110, can also be made equal to or lower than the melting start temperature Ti of the binder resin 7+25° C., expressed as TC≈TR1≤Ti+25° C.; for example, in the present embodiment and others, TC≈TR1≤180° C. Thus, the binder resin 7, resulting from melted binder particles 17 of the composite particles 15 in the uncompressed negative electrode layer 13, existing near the second surface 2B of the current collecting foil 2, decreases in viscosity and hence the adhesive strength lowers but does not excessively lower. This can prevent the binder resin 7 and the active material particles 6 once adhered to the second surface 2B of the current collecting foil 2, that is, the negative electrode layer 3 immediately after compression, from peeling off from the second surface 2B of the current collecting foil 2 and adhering to the second outer surface 120G of the second roll 120.

Furthermore, the roll-pressing step S2 may be performed with the second outer peripheral surface temperature TR2 set to be lower by 10° C. or more than the first outer peripheral surface temperature TR1 and fall within a temperature range equal to or less than the melting start temperature Ti of the binder resin 7+5° C., expressed as TR2≤TR1−10° C., and TR2≤Ti+5° C.; for example, in the present embodiment and others, TR2≤TR1−10° C., and TR2≤160° C.

Since the second outer peripheral surface temperature TR2 is set to be sufficiently lower than the first outer peripheral surface temperature TR1 as described above, it is possible to prevent the binder resin 7 and the active material particles 6 from adhering to the second outer peripheral surface 120G of the second roll 120.

In particular, in the present embodiment and each investigation examples, graphite particles are used as the active material particles 6 and PVDF is used as the binder resin 7. For this reason, the negative electrode sheet 1 can be appropriately produced.

The present disclosure is described in the foregoing embodiments and each investigation example, but the present disclosure is not limited to the foregoing embodiments and others, and may be embodied in other specific forms without departing from the essential characteristics thereof.

For example, in the foregoing embodiment, the uncompressed negative electrode layer 13 of the uncompressed negative electrode sheet 11 is formed by use of a deposition device DP configured to once adsorb the composite particles 15 onto magnetic carrier particles, convey the composite particles 15 to a deposition area with a magnet roll, and then allow the composite particles 15 to fly by electrostatic force toward the current collecting foil 2 so that the composite particles 15 deposit on the current collecting foil 2, forming the uncompressed negative electrode layer 13.

However, it is sufficient to form an uncompressed negative electrode sheet 11 having an uncompressed negative electrode layer 13 containing composite particles 15 deposited on the current collecting foil 2. For example, another deposition device DP provided with a gravure roll (not shown) having an outer peripheral surface formed with concave and convex portions may be used. In this case, composite particles 15 are filled in the concave portions of the gravure roll, and the composite particles 15 in the concave portions are continuously moved by electrostatic force to the second surface 2B of the current collecting foil 2, so that the composite particles 15 are deposited on the current collecting foil 2, forming the uncompressed negative electrode layer 13. Further, another deposition device DP may also be used, in which composite particles 15 are sprayed to deposit on the second surface 2B of the current collecting foil 2, forming the uncompressed negative electrode layer 13, without using electrostatic force.

REFERENCE SIGNS LIST

1 Negative electrode sheet (Electrode sheet)
2 Current collecting foil
2A First surface (of Current collecting foil)
2B Second surface (of Current collecting foil)
3 Negative electrode layer (Electrode layer)
3U Negative-electrode-layer outer surface (of Negative electrode sheet)

6 Active material particles
7 Binder resin
11 Uncompressed negative electrode sheet (Uncompressed electrode sheet)
13 Uncompressed negative electrode layer (Uncompressed electrode layer)
13U Negative-electrode-layer outer surface (of Uncompressed negative electrode layer) (Electrode layer outer surface)
15 Composite particles
17 Binder particles
DL Longitudinal direction (of Negative electrode sheet, Uncompressed negative electrode sheet)
110 First roll
110G First outer peripheral surface (of First roll)
120 Second droll
120G Second outer peripheral surface (of Second roll)
GP Roll gap
TR1 First outer peripheral surface temperature
TR2 Second outer peripheral surface temperature
T Temperature
Ti Melting start temperature (of Binder resin)
Tm Melting point (of Binder resin)
TS Sheet temperature (of Negative electrode sheet, Uncompressed negative electrode sheet)
TC Current collecting foil temperature (of Current collecting foil)
TE Outer surface temperature (of Negative electrode layer, Negative-electrode layer outer surface of Uncompressed negative electrode layer)
S2 Roll-pressing step

What is claimed is:

1. A method for producing an electrode sheet that includes a current collecting foil having a first surface and a second surface, which is opposite the first surface, and an electrode layer on the second surface,
the method comprising:
roll-pressing an uncompressed electrode sheet,
the uncompressed electrode sheet including:
the current collecting foil; and
an uncompressed electrode layer formed on the second surface of the current collecting foil and made from deposited composite particles including active material particles and a plurality of binder particles bonded to each of the active material particles, the binder particles being made of binder resin and each having a smaller diameter than each of the active material particles,
the uncompressed electrode sheet having a sheet temperature that is a room temperature,
by feeding the uncompressed electrode sheet to pass through a roll gap between a first roll having a first outer peripheral surface which is brought in contact with the first surface of the current collecting foil and a second roll having a second outer peripheral surface which is brought in contact with an outer surface of the uncompressed electrode layer to compress the uncompressed electrode sheet in a thickness direction, and heating the uncompressed electrode sheet in the roll gap so that the active material particles are bonded to each other through the binder resin and the active material particles are bonded to the second surface of the current collecting foil through the binder resin,
wherein the roll-pressing is performed under conditions that:
the first outer peripheral surface of the first roll has a first outer peripheral surface temperature set to fall within a temperature range from a melting start temperature of the binder resin +5° C. to the melting start temperature +25° C., expressed as Ti+5° C.≤TR1≤Ti+25° C., and
the second outer peripheral surface of the second roll has a second outer peripheral surface temperature set to be lower than the first outer peripheral surface temperature and fall within a temperature range equal to or less than the melting start temperature of the binder resin +5° C., expressed as TR2<TR1, and TR2≤Ti+5° C., wherein Ti is the melting start temperature, TR1 is the first outer peripheral surface temperature, and TR2 is the second outer peripheral surface temperature.

2. The method for producing an electrode sheet according to claim 1, wherein
the roll-pressing is performed under conditions that:
the second outer peripheral surface temperature is lower by 10° C. or more than the first outer peripheral surface temperature and falls within a temperature range equal to or less than the melting start temperature of the binder resin +5° C., expressed as TR2≤TR1−10° C., and TR2≤Ti+5° C.

3. The method for producing an electrode sheet according to claim 2, wherein
the active material particles are graphite particles, and the binder resin is polyvinylidene chloride (PVDF).

4. The method for producing an electrode sheet according to claim 1, wherein
the active material particles are graphite particles, and the binder resin is polyvinylidene chloride (PVDF).

* * * * *